United States Patent [19]

Vick

[11] Patent Number: 4,896,218

[45] Date of Patent: Jan. 23, 1990

[54] CIRCULARLY POLARIZED MULTI-BANDPASS INTERFERENCE CONTRAST ENHANCEMENT FILTER

[75] Inventor: Gerald L. Vick, Mount Vernon, Iowa

[73] Assignee: Rockwell International Corporation, El Segundo, Calif.

[21] Appl. No.: 93,844

[22] Filed: Sep. 4, 1987

[51] Int. Cl.[4] .............................................. H04N 5/72
[52] U.S. Cl. .................................. 358/253; 358/252; 350/276 R; 350/316
[58] Field of Search ...................... 350/370, 27 G, 284, 350/399, 316, 321; 358/252, 253; 356/316; 313/112, 474, 473

[56] References Cited

U.S. PATENT DOCUMENTS

| | | |
|---|---|---|
| 3,247,392 | 4/1966 | Thelen . |
| 3,423,147 | 1/1969 | Thelen . |
| 3,504,959 | 4/1970 | Hennessey . |
| 3,551,590 | 12/1970 | Boothroyd . |
| 3,736,050 | 5/1973 | Bolum ................................. 358/252 |
| 3,759,604 | 9/1973 | Thelen . |
| 3,760,215 | 9/1973 | Sach ................................... 358/253 |
| 3,866,220 | 2/1975 | Embling .............................. 342/55 |
| 3,981,568 | 9/1976 | Bartolomei . |
| 4,097,155 | 6/1978 | Appert ................................ 356/252 |
| 4,240,696 | 12/1980 | Tracy et al. . |
| 4,253,737 | 3/1981 | Thomsen et al. . |
| 4,432,644 | 2/1984 | Demers ............................... 356/316 |
| 4,492,434 | 1/1985 | Bottka et al. . |
| 4,515,442 | 5/1985 | Aron .................................... 358/61 |
| 4,534,620 | 8/1985 | Gale et al. . |
| 4,568,140 | 2/1986 | van der Werf et al. . |
| 4,663,562 | 5/1987 | Miller ................................. 313/474 |
| 4,683,398 | 7/1987 | Vriens ................................ 358/237 |
| 4,708,482 | 11/1987 | Neiheisel ........................... 356/376 |

OTHER PUBLICATIONS

*Principles of Optics*, by Born & Wolf, Pergamon Press, 1959, pp. 51, 65–69.

Primary Examiner—Edward L. Coles, Sr.
Assistant Examiner—Jerome Grant, II
Attorney, Agent, or Firm—Gregory G. Williams; M. Lee Murrah; H. Fredrick Hamann

[57] ABSTRACT

A contrast enhancement filter for use on display devices which utilizes a multiple bandpass optical interference filter with the passbands matched to any predetermined desired frequencies of the display device and a circular polarizer disposed outwardly from said interference filter and an anti-reflective coating deposited thereon.

5 Claims, 1 Drawing Sheet

CIRCULARLY POLARIZED MULTI-BANDPASS INTERFERENCE CONTRAST ENHANCEMENT FILTER

BACKGROUND OF THE INVENTION

The present invention generally relates to visual display devices, and more particularly is concerned with filters for enhancing the image contrast of such devices.

With the ever-expanding frontiers of space and aviation, and with modern aircraft now operating at altitudes which only a few decades ago were thought to be impossible, it is becoming increasingly important to overcome some problems introduced by high altitude flight. Currently, a major concern is the improvement of contrast of visual displays within the cockpit. At high altitudes, the ambient light is quite bright and often greatly reduces the image contrast of avionics equipment displays. The contrast reduction is typically observed when ambient light strikes the faceplate or an interior display generating surface of a visual display device and is then reflected back away from the display toward the viewer.

Typically, several types of displays are used in aircraft cockpits. Cathode ray tubes (CRTs), thin film electroluminescent (TFEL) matrix displays, and liquid crystal displays (LCDs) are used, with the CRT becoming by far the predominant display device. While the discussion herein is largely focused on the application of this invention to CRTs in an aviation environment, it is equally applicable to other types of displays which have a faceplate and an interior display generating surface as well as in non-aviation environments. CRTs, whether used for radar, laboratory work or for home television screens, etc., are made in essentially the same way. The tube is usually made of glass and has a front or viewing face. On the inner side of this face is an interior display generating surface of phosphors which are activated by electrons striking them from the rear of the tube to cause them to glow and give off diffuse light. Depending upon the purpose, they are activated selectively in response to input signals to produce images of many types, such as cloud patterns for weather radar, dots, blips or pips for other radar instruments, and photographic-type pictures as in home television.

Ambient light striking the face of a cathode ray tube produces two problems. The more minor problem is refection off the first surface of the glass. In home television, the majority of this reflection is off the first surface of the safety glass. This problem can be reduced to a fairly satisfactory level by producing a low reflecting or "non-reflecting" coating on the glass. Similar measures also have been commonly used in aircraft.

The second and considerably more serious problem is that of the ambient light rays passing through the glass of the tube and striking the phosphors. In addition to being diffuse emitters of light, the phosphors also act as diffuse reflectors. Consequently, the ambient light rays are reflected diffusely off all the phosphors, whether or not they are being activated by the electron discharge of the tube at the time. Since the ambient light, particularly on a bright day in an airplane at high altitude, may be far greater than the light of the activated phosphors, the reflected ambient light may and frequently does completely "wash out" or obliterate the signal. This results from the fact that the shadows, background, or low lights, are illuminated by the ambient light to such an extent that they cannot be distinguished from the signals, or high lights. The contrast is thereby degraded; the image is confused and in some cases completely lost.

Numerous methods and devices have been proposed to enhance the contrast of display devices in environments having bright ambient light. One typical method and device used is shown in U.S. Pat. No. 4,253,737 to A. J. Thomsen on Mar. 3, 1981. This device essentially is an externally structured and patterned light abosrption filter placed in front of the CRT, between the screen and the viewer.

While this system or variations of it have been used for filtering ambient light, they do have serious drawbacks. One major problem with such filters is the fact that they will absorb equally the light generated by the CRT as well as the ambient light and this tends to decrease the degree of contrast enhancement that can be attained.

Consequently, a need exists for improvement in contrast enhancement filters for visual displays in environments having bright ambient light which will result in increased contrast enhancement.

SUMMARY OF THE INVENTION

It is a object of the present invention to provide a light filter which enhances the contrast of visual display devices.

It is a feature of the present invention to provide a circular polarizer in conjunction with a multi-bandpass interference filter.

It is an advantage of the present invention to greatly reduce the amount of ambient light which is reflected back from the visual display device toward the viewer while only slightly diminishing the intensity of the light generated by the visual display device.

It is another object of the present invention to provide a light filter which selectively passes several narrow bands of visible light.

It is another feature of the present invention to match the several passbands of the multi-bandpass interference filter with the several wavelengths of the emissive display device.

It is another advantage of the present invention to provide for a high degree of transmission of the desired display emission while concomitantly providing for a great reduction in light from all other sources.

The present invention provides a contrast enhancement filter designed to fulfill the aforementioned needs, satisfy the earlier propounded objects, contain the above described features and produce the previously stated advantages. The invention is carried out by a "Double Polarized" reflection reduction apparatus, in the sense that incoming ambient light is polarized before it strikes the display phosphors and is again polarized after reflection from the phosphors.

Accordingly, the present invention relates to a contrast enhancement filter utilizing a multiple bandpass filter in conjunction with a circular polarizer.

BRIEF DESCRIPTION OF THE DRAWINGS

An invention may be more fully understood by reading the following description of a preferred embodiment of the invention in conjunction with the appended drawings wherein.

DETAILED DESCRIPTION

Figure 1:
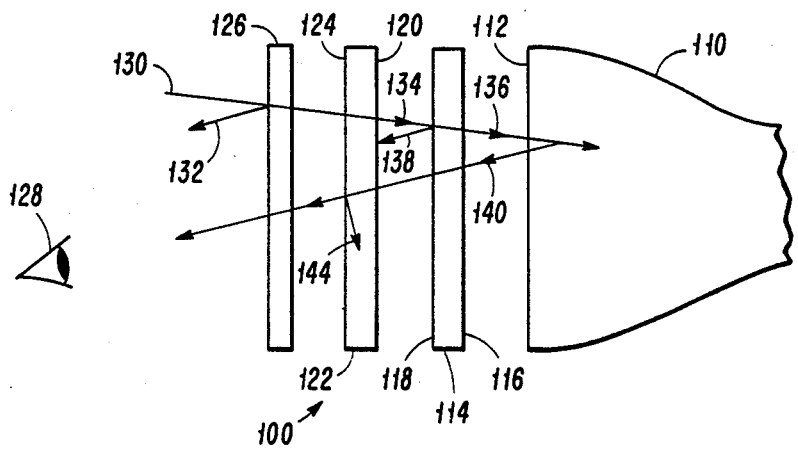
FIG. 1 is a schematic representation of a preferred embodiment of the present invention showing a CRT having an interference filter, circular polarizer and anti-reflective coating successively positioned outwardly from the CRT faceplate.

Referring now to the drawings, in more particular to FIG. 1, there is shown a contrast enhancement filter generally designated 100, which incorporates a preferred embodiment of the present invention. CRT 110 is shown having a faceplate region 112 and a planar multiple bandpass optical interference filter 114 having an interior surface 116 and an exterior surface 118. Interference filter 114 typically is a planar sheet placed across the faceplate 112 of the CRT 110 so that the interior surface 116 is in contact with faceplate 112. Filter 114 similar to the type described in Born & Wolf, *Principles of Optics,* Pergamon Press, 1959, pp. 51, 65–69, incorporated herein by this reference but any suitable multi-bandpass optical interference filter which is capable of passing several narrow passbands while rejecting all others may be substituted. Exterior surface 118 of filter 114 is in contact with interior polarizer surface 120 of polarizer 122 which further has an exterior polarizer surface 124. Polarizer 122 is preferably a planar sheet circular polarizer which is well-known in the art. As anti-reflective coating 126 is formed on the exterior polarizer surface 124 of polarizer 122.

In operation, a typical viewer 128 will look through the anti-reflective coating 126, the polarizer 122, and the interference filter 114 to the faceplate 112 of the CRT 110. A typical incident ambient light ray 130 is shown incident upon the anti-reflective coating 126 where a very small percentage of light 132 is reflected back toward the viewer 128. The remainder of the incident light 130, which is not reflected, then passes through coating 126 and encounters the polarizer 122 thereby passing only polarized light 134 towards the interference filter 114, which passes light 136 in several narrow passbands while reflecting light 138, with a phase shift, back toward polarizer 122. The light 138 with its phase shift will not pass through polarizer 122. Light 136, within the narrow passbands will strike the phosphors on the phase plate 112 of the CRT 110 and be diffusely reflected back toward the interference filter 114. The diffusely reflected light 140 will by its nature be reflected at angles very different from the general angle of incidence of the light 136. A portion 144 of the light 140 will be at a sufficiently large angle to be totally internally reflected within the polarizer 122.

Filters and other displays that utilize polarizers are often noted for problems in off-axis viewing. There are several ways to mitigate these problems in the current design.

While not wishing to be bound by theory, it is believed that the advantageous results of the invention are obtained because of the following reasons detailed in the following theoretical analysis.

Figure 2:
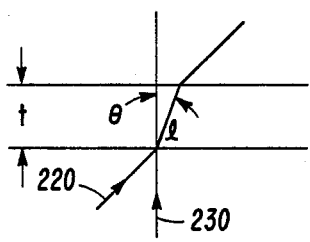
FIG. 2 is a schematic representation of a representative light ray passing through an interference filter shown in FIG. 1.

The interference filter performance often depends upon the effective optical thickness seen by the light ray as it passes through the filter to determine the wavelengths passed or reflected. Now referring to FIG. 2 a ray of light 220 that passes through a layer of thickness t at an angle $\theta$ will see a longer optical path 1 than a perpendicular ray 230 that passes through the layer at right angles to the surfaces. The two path lengths (and hence the wavelengths of the bands passed or rejected) will be related by the secant of the angle. The actual path length 1 is $$l = t \text{ secant } \theta$$

Figure 3:
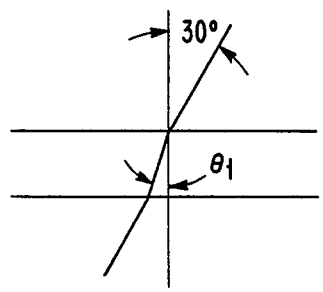
FIG. 3 is another schematic representation of a representative light ray demonstrating the angular dependence of the interference filter in FIG. 1.

The band edge will also be shifted by the same amount $$\lambda(\theta) = \lambda_o \text{ secant } \theta$$

where: $\lambda(\theta)$ is the wavelength of the band edge at a function of an angle and $\lambda_o$ is the design band edges Now referring to FIG. 3; consider, as an example only, an interference filter with a passband of ±1 nm centered at 500 nm with an effective index of refraction of 2. Consider further that it is desired to view the light passed by this filter at an angle of 30° from normal.

Light emerging from the filter at an angle of 30° will have passed through the filter at an angle of $\theta_1 = \sin^{-1}(\sin 30°)/2 = 14.5°$.

The filter wavelength at this angle will typically be shifted to a new wavelength centered at $$\lambda(30) = \lambda \text{secant } \theta_1 = 516.4 \text{ nm}$$

which is far out of the passband of the same filter viewed at normal incidence. The shift in center wavelength of 16 nm is much greater than the width of the passband. Therefore, this filter is totally unuseable at this angle.

If the index of refraction were 3 rather than 2, the angel, $\theta_1$, would be:

$$\theta_1 = \sin^{-1}\frac{\sin 30°}{(3)} = 9.6°$$

rather than 14.5 and the shift in center wavelength would be $$\lambda_{30} = \lambda \text{secant } 9.6 = 507.1.$$

It follows that viewing angle performance may be improved by using high index materials to form the interference filter. However, there is a cost in terms of added losses of light due to the greater reflectivity and trapping of light by total internal reflection.

Figure 4A:
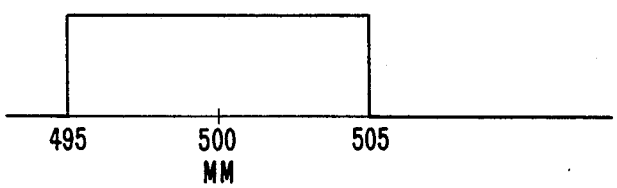
FIG. 4a and 4b is another schematic representation of an angular performance of the present invention.
Figure 4B:
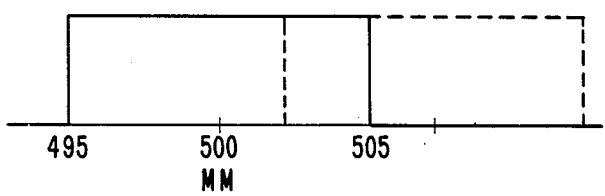

Suppose, now, that instead of a 2 nm bandwidth our filter had a 10 nm bandwidth and that the light of interest has a rectangular spectral response that exactly fits the bandpass at normal viewing angle. Then, as shown in FIGS. 4A and 4B, where a solid line represents the pass band at normal viewing angles and the intermittent line represents the pass band at approximately 30° viewing angle, some of the light is passed (29.9°). Viewing performance may be improved by using a wider passband.

Figure 5A:
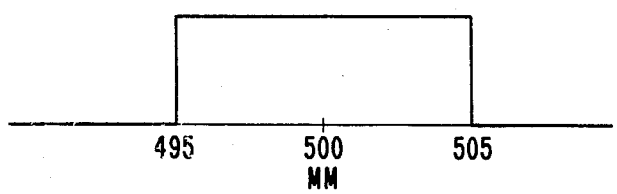
FIG. 5a and 5b is yet another schematic representation of the angular dependence of the interference filter of the present invention.
Figure 5B:
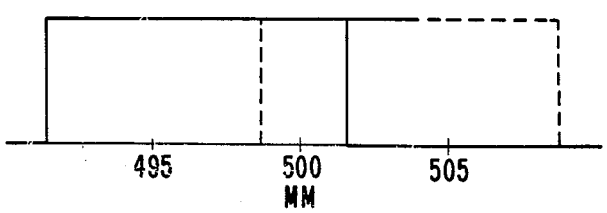

Now referring to FIGS. 5A and 5B, suppose further that we design this same filter with a center wavelength of 496.5 rather than 500 nm.

At a normal viewing angle, the filter now passes approximately 65 per cent of the desired light, increasing to 100 per cent at some angle between 0° and 30° and dropping to 65 percent at 30°. Light will be visible at greater angles (up to approximately 41.2°) but with reduced contrast.

It may be desirable to reduce the passband. For a passband of approximately 6.5 nm (±3.25) in the above example, 65 per cent of the light will be passed at all angles and contrast will be improved because passage of unwanted light will be reduced.

Furthermore, the angular dependence of the half-wave plate, which in combination with linear polarizer constitute a circular polarizer, is similar to that of the interference filter in that the device depends for its effectiveness on the distance traveled through the medium. A half-wave plate is typically a birefringent material of thickness such that the two light waves of mutually orthogonal polarization become separated in phase by ½ wavelength during transit through the medium. If the length traversed by the light ray is longer than intended due to angle, the phase difference will be greater than ½ wavelength and the light will become elliptically polarized rather than circularly polarized and reflected light will not be completely extinguished upon reflection back through the circular polarizer. The off-axis effect of the interference filter was to decrease the "signal" or light emitted by the display. The effect of the half-wave plate is to increase that "noise" or unwanted incident light reflected from the display surfaces.

In the case of the interference filter, the off-axis effects of the half-wave plate can be mitigated, to some degree, by using a high refractive index material and by adjusting the thickness such that light transiting in the normal direction experiences slightly less than ½ wavelength phase shift.

It is thought that the circularly polarized multi-bandpass interference contrast enhancement filter, and many of its attendant advantages, will be understood from the foregoing description, and it will be apparent that various changes may be made in the form, construction, and the arrangement of the parts and the steps thereof, without departing from the spirit and scope of the invention, or sacrificing all of their material advantages, the form hereinbefore described being merely preferred or exemplary embodiments thereof.

I claim:

1. A display device comprising:
   a. a cathode ray tube for generating an emissive display in response to some input signal;
   b. a face plate disposed upon said cathode ray tube through which the emissive display is viewed;
   c. a multiple bandpass optical interference filter disposed outwardly of said face plate for selectively passing only certain wavelengths of light;
   d. a polarizer disposed outwardly of said multiple bandpass filter for selectively passing only light with predetermined electric field properties;
   e. an anti-reflective coating disposed outwardly of said polarizer for decreasing ambient light from reflecting off said polarizer; whereby, ambient light approaching the cathode ray tube first encounters the anti-reflective coating and then is polarized by said polarizer and further is filtered by said multiple bandpass filter allowing only certain predetermined wavelengths of light to pass on to said face plate of said cathode ray tube where portion of the remaining light will be reflected back toward said polarizer and a smaller portion of said light will be transmitted through to the anti-reflective coating and away from the cathode ray tube.

2. A display device of claim 1 wherein said polarizer is a circular polarizer.

3. A display device comprising:
   a. color cathode ray tube having phosphors therein with certain predetermined emissive characteristics for generating an emissive display in response to some input signal;
   b. A face plate disposed upon said cathode ray tube through which emissive display is viewed;
   c. a multiple bandpass optical interference filter disposed outwardly of said face plate with certain predetermined passbands which are relatively matched with said predetermined emissive characteristics of said phosphors of said cathode ray tube, for selectively passing only certain wavelengths of light;
   d. a polarizer disposed outwardly of said multiple bandpass filter for selectively passing only light with predetermined electric field vector properties;
   Whereby, ambient light approaching the cathode ray tube first encounters the anti-reflective coating and then is polarized by said polarizer and further is filtered by said multiple bandpass optical interference filter allowing only certain predetermined wavelengths of light to pass on to said face plate of said cathode ray tube where portion of the remaining light will be reflected back toward said polarizer and a smaller portion of said light will be transmitted through the anti-reflective coating away from the cathode ray tube.

4. A display device of claim 3 wherein said polarizer is a circular polarizer.

5. An apparatus for displaying information in a relatively high ambient light environment, comprising:
   a. a multicolor cathode ray tube having a plurality of emissive phosphors therein, each with a predetermined emissive wavelength, for generating an emissive display in response to an input signal;
   b. a multiple band pass, optical interference filter disposed outwardly of said phosphors having a plurality of predetermined pass bands for selectively transmitting only certain wavelengths of light;
   c. at least one of said pass bands centered around a shorter wavelength than said predetermined emissive wavelength of at least one of said plurality of phosphors;
   d. a polarizer disposed outwardly of said filter for passing there through only light with a certain predetermined electric field vector; and,
   e. a reflection reducing surface disposed outwardly of said polarizer for reducing the ambient light reflecting back toward the viewer.

* * * * *